(12) United States Patent
Van Acquoij et al.

(10) Patent No.: US 9,600,748 B2
(45) Date of Patent: Mar. 21, 2017

(54) METHOD FOR DETERMINING A SHEET HEIGHT

(71) Applicant: OCÉ-TECHNOLOGIES B.V., Venlo (NL)

(72) Inventors: Catharinus Van Acquoij, Venlo (NL); Daisuke Kawaguchi, Venlo (NL); Cornelius M. F. Janssen, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 14/954,414

(22) Filed: Nov. 30, 2015

(65) Prior Publication Data

US 2016/0155029 A1    Jun. 2, 2016

(30) Foreign Application Priority Data

Dec. 1, 2014  (EP) ..................... 14195628

(51) Int. Cl.
*G06K 15/02* (2006.01)
*H04N 1/00* (2006.01)
*B65H 43/08* (2006.01)
*B41J 11/00* (2006.01)
*G01B 11/06* (2006.01)

(52) U.S. Cl.
CPC ........... *G06K 15/02* (2013.01); *B41J 11/0035* (2013.01); *B41J 11/0095* (2013.01); *B65H 43/08* (2013.01); *G01B 11/0608* (2013.01); *G01B 11/0691* (2013.01); *H04N 1/00716* (2013.01); *H04N 1/00734* (2013.01); *H04N 1/00745* (2013.01)

(58) Field of Classification Search
None
See application file for complete search history.

(56) References Cited

U.S. PATENT DOCUMENTS

| | | | | |
|---|---|---|---|---|
| 6,392,754 B1 * | 5/2002 | Pingel | ................. | G01B 11/255 356/239.1 |
| 6,975,410 B1 * | 12/2005 | Sturgill | ................. | G01B 11/06 356/631 |
| 2005/0280687 A1 | 12/2005 | Kurahashi | | |
| 2009/0237757 A1 * | 9/2009 | Sawada | ................ | H04N 1/6097 358/518 |
| 2011/0279507 A1 | 11/2011 | Castillo et al. | | |
| 2012/0243928 A1 | 9/2012 | Schweid et al. | | |

(Continued)

*Primary Examiner* — Andrew H Lam
(74) *Attorney, Agent, or Firm* — Birch, Stewart, Kolasch & Birch, LLP

(57) ABSTRACT

A method is provided for determining a sheet height of a sheet conveyed by a sheet transportation unit. An optical sensor is used for sensing the surface geometry of the sheet, resulting in a two-dimensional height image of the sheet. The height image has pixels that have a value representing a local height of the sheet. The method comprises the steps of: a) selecting from the height image pixels that have a deviating value; b) substituting the deviating value of a selected pixel by a realistic value that is derived from not selected pixels; and c) determining a sheet height by finding a maximum value from the values of the not selected pixels and the substituted values. Furthermore, a print system is provided that comprises a control unit that is configured to apply the invented method.

8 Claims, 2 Drawing Sheets

(56) References Cited

U.S. PATENT DOCUMENTS

2014/0192368 A1* 7/2014 Endo .................... B41J 11/0035
356/630
2014/0347473 A1* 11/2014 Wolff ................. G01B 11/2522
348/135

* cited by examiner

METHOD FOR DETERMINING A SHEET HEIGHT

BACKGROUND OF THE INVENTION

1. Field of the Invention

The present invention relates to methods for determining a sheet height in a sheet transportation unit, in particular in order to separate sheets that extend beyond a predefined height from other sheets not extending beyond that height. The invention also relates to a printing system that includes a sheet transportation unit and an optical sensor for determining a sheet height.

2. Description of the Related Art

In a known print process, a sheet of a medium, such as paper, is separated from a stack and conveyed by a sheet transportation unit towards a print process unit for having applied marking material, such as ink, on a side of the sheet directed to the print process unit, while the sheet passes the print process unit. The distance between the print process unit and the sheet, also known as the print gap, is usually kept small, in the order of 1 to 2 mm, for achieving a high print quality. Because of this small distance, elements of the print process unit, such as print heads, are easily touched by a sheet that passes these elements, particularly if the sheet may have defects that extend above a regular, nominal height over a supporting surface of the sheet transportation unit. Since these touches may lead to degradation of the achieved print quality, to faults in the print process unit, such as nozzle failure in the case of inkjet printing, or even to sheet jams that block the transportation path for further sheets, it is needed to prevent any contact between the print process unit and the moving sheet.

A possible solution for preventing a contact between a sheet and a print process unit is to determine a sheet height of a sheet before it comes to the print process unit and to eliminate from the transportation unit sheets that have a sheet height above a predetermined height limit. A sheet height may be determined by optical means, such as an optical sensor that applies electromagnetic radiation and an optical triangulation technique to determine a spatial location of sheet surface points from data derived from the projected and reflected radiation. The height of the sheet surface points are collected in a two-dimensional raster image, wherein a pixel is associated with a part of the scanned surface and a pixel value represents a local height of the sheet, as sampled by the optical sensor.

However, a problem exists in deriving a criterion for rejecting a sheet to proceed to the print process unit. A limit may be set for a height value that occurs for any pixel in the height image. If this limit is too high, sheets may pass that give problems with the print process unit. These sheets are called false positives. If a limit is set too low, too many sheets will be discarded, that would not have given any problem if allowed to pass towards a process unit, thereby unnecessarily lowering the productivity of a printing system. These sheets are also known as false negatives. At the same time, the height value of every pixel has to be reliable. A height value of a pixel corresponds to a height of a part of the sheet as measured by an optical sensor using a radiation spot size and a predetermined size of a detection element. It has experimentally been found that a deviating height value arises for a part of the sheet that is not sufficiently flat with respect to the optical sensor. These parts thereby have an uncontrolled influence on the sheet height determination. In particular, deviating height values occur at the sheet edges, where pixels are partly associated with a sheet surface part at the sheet edge and partly with a supporting surface of the sheet transportation unit, since these pixels overlap an edge of the medium sheet.

It is an object of the present invention to handle deviating height values and their influence on the sheet height determination.

SUMMARY OF THE INVENTION

According to the present invention, a method is provided for determining a sheet height of a sheet conveyed by a sheet transportation unit using an optical sensor that senses the surface geometry of the sheet, resulting in a two-dimensional height image of the sheet, having pixels that have a value representing a local height of the sheet, comprising the steps of: a) selecting pixels from the height image that have a deviating value; b) substituting the deviating value of a selected pixel by a realistic value that is derived from not selected pixels; and c) determining a sheet height by finding a maximum value from the values of the not selected pixels and the substituted values. The processing of the height image in the indicated way improves the reliability of the sheet height measurement in a way that a limit may be determined for allowing a sheet to continue its transportation path, without false positives, which would result in problems downstream, or false negatives, which would unnecessarily lower a productivity.

In a specific embodiment, a pixel is selected for having a deviating value if a first difference between the pixel value and a nearest neighbour pixel value exceeds a predetermined threshold. A nearest neighbour pixel is one of four pixels directly adjoining a pixel. It has been found that a large difference between a pixel value and a nearest neighbour pixel value indicates a pixel having a deviating height value and thus relating to a part of the sheet that is not sufficiently flat or otherwise not expedient for height measurement.

In a further embodiment, a pixel is selected for having a deviating value if, in addition to the first difference, a difference between the pixel value and a further nearest neighbour pixel value also exceeds a predetermined threshold and is opposite to the first difference. Depending on a direction in the height image relative to the transport direction of the sheet, deviating values tend to arise around leading and trailing edges of the sheet, having two opposite gradients with neighbouring pixels. Since these pixel values hamper the determination of a sheet height, they are to be selected for substitution.

In a further embodiment, the realistic value is derived from the nearest neighbour values by selecting one of the nearest neighbour values. By substituting a selected pixel value by a nearest neighbour value, a sheet height does not depend on the deviating value, but on the more reliable neighbour value. This procedure comes down to ignoring the deviating value altogether, because the sheet height would be determined using the neighbour value anyway.

In a another embodiment, the realistic value is derived from the nearest neighbour values by extrapolating a number of values of pixels in a line pointing to the selected pixel. An extrapolation yields a better estimation of a local height value, thus enhancing the reliability of a determined sheet height from the maximum values, but this procedure may involve additional processing resources.

In a further embodiment, a light beam is applied perpendicular to a sheet surface and the optical sensor is directed in a direction opposite to a transport direction of the sheet. This configuration is beneficial for obtaining overestimated deviating values around the leading edge of the sheet. Since sheet deformations occurring around the leading edge are the most disturbing ones with respect to sheet passage, an underestimation of the local height is certainly to be avoided. Still, overestimated deviating values may lead to false negatives. Therefore, the reliability of the sheet transportation is enhanced by combining the indicated configuration with the presently invented method.

The present invention may also be embodied in a print system that comprises a sheet transportation unit for conveying a sheet to a print process unit, an optical sensor for sensing a surface geometry and a control unit configured to determine a sheet height from a two-dimensional height image of the sheet by the steps of selecting from the height image pixels that have a deviating value, substituting the deviating value of a selected pixel by a realistic value that is derived from not selected pixels, and determining a sheet height by finding a maximum value from the values of the not selected pixels and the substituted values.

In a further embodiment, the printing system comprises a sheet expelling unit that expels a sheet from the transportation unit before the sheet arrives at the print process unit if the determined sheet height exceeds a predetermined threshold. Since the sheet height is more reliably determined by the control unit, the productivity of the print system is not unnecessarily lowered.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention. In these drawings.

DETAILED DESCRIPTION OF EMBODIMENTS

Figure 1:
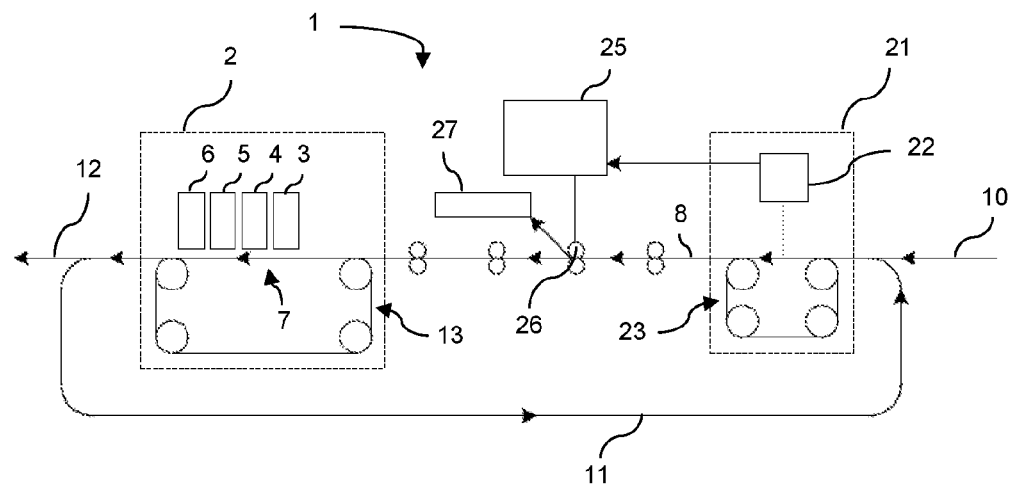
FIG. 1 is a schematic side view of a printing system with a sheet height determination according to an embodiment of the present invention.

The present invention will now be described with reference to the accompanying drawings, wherein the same or similar elements are identified with the same reference numeral.

With reference to FIG. 1 of the drawings, the inkjet printing system 1 according to the preferred embodiment of the invention is shown to include a print process unit 2, a sensing unit 21 for identifying deformations in a transported sheet and a control unit 25. Sheets on a supporting surface 8 of a sheet transportation unit enter the printing system from the right side 10 and leave the system on the left side 12. The transport path includes both a simplex path from 10 to 12 and a duplex path 11 for turning around and returning a printed sheet. The sensing unit 21 and print process unit 2 are arranged such that both sheets on the simplex path and returning sheets on the duplex path pass sensing unit 21. The print process unit 2 comprises four marking devices 3, 4, 5, and 6 each having one or more inkjet printheads for marking a sheet as it passes the print area 7. In the print area, a sheet of a print medium may optionally be arranged on a surface of a temperature controlled transport mechanism 13 in order to have a controlled print environment for the sheet. The heaters, e.g. radiation heaters, and/or cooling means, such as a cold blast, that are used to control and maintain the temperature in a predetermined range, are not shown in FIG. 1.

A sensor device 22 in the form of an optical sensor, such as a laser scanner, is provided within the sensing unit 21 for sensing the surface geometry or topology of the sheets that are transported on a first or a second pass along the transport path from 10 to 12. During a measurement by the sensor device, a sheet is conveyed in substantially the same manner by the conveyor 23 as a sheet is later transported during printing in the print area 7 by the transport mechanism 13 in order to maintain a high productivity of the printing system and to obtain an accurate and reliable measurement. Both the transport mechanism 13 and the conveyor 23 include a belt transport device with vacuum sheet-holding pressure.

The measurement data from sensing device 22 are sent to the data processor 25. This processor is configured to execute a method for deriving a sheet height and for making a decision if the sheet that is conveyed is suitable to pass to the print process unit 2. Based on this decision, the data processor 25 transmits a control signal to removal device or ejector device 26 for regulating the transport or conveyance of a sheet either to the print process unit 2 or to a reject tray 27. The removal device 26, located between the sensing unit 21 and the print process unit 2, may employ different means for redirecting sheets from the transport path towards the reject tray 27. In this particular embodiment, rollers are used. Using this arrangement, sheet jams within the print process unit may be avoided if the determined sheet height is larger than a gap between the supporting surface of the sheet and a position of the marking devices in the print area 7.

Figure 2A:
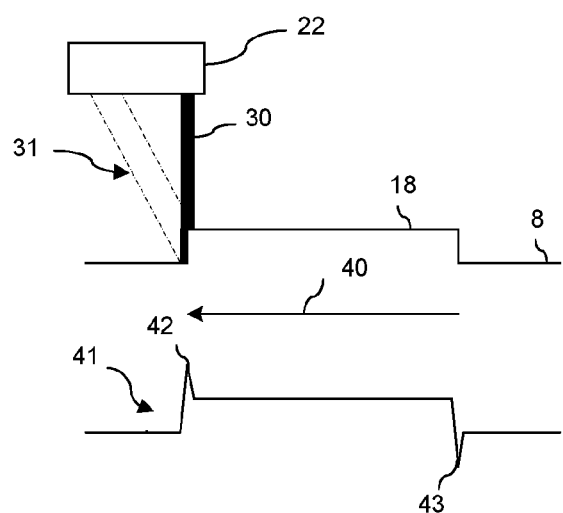
FIG. 2A is a preferred configuration for determining a sheet height.
Figure 2B:
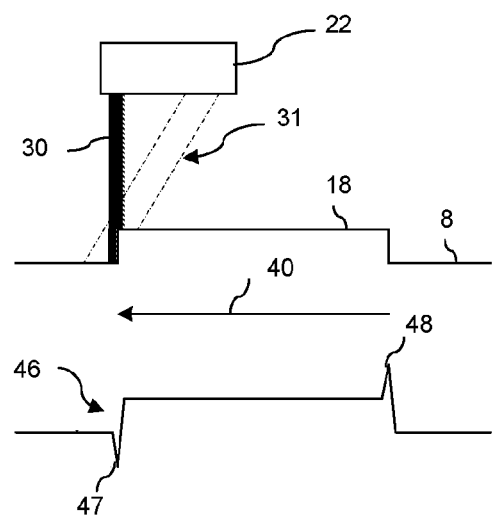
FIG. 2B is an alternative configuration for determining a sheet height.

Referring to FIG. 2A, a preferred configuration of the sensing device 22 with respect to the sheet 18 on the supporting surface 8 and its transport direction 40 is shown. The sensing device emits a radiation beam 30 and comprises a sensor for receiving reflected radiation in a direction 31. This direction is preferably opposed to the transport direction 4, because the measurement signal 41 will show in this configuration an overshoot 42 at the leading edge of the sheet and an undershoot at the trailing edge. It is preferred to have an overshoot at the leading edge, since an excess height at the leading edge of the sheet may cause more problems in the passage of the sheet in the print area, than an excess height at the trailing edge. In contrast, in a configuration as shown in FIG. 2B, where the reflected radiation is measured in a same direction as the transport direction of a sheet, the measurement signal 46, will show an undershoot 47 at the leading edge of the sheet and an overshoot 48 at the trailing edge. Although the undershoot and overshoot may be corrected by processing the deviating values in the measurement data, it is preferred not to completely rely on this correction.

Figure 3:
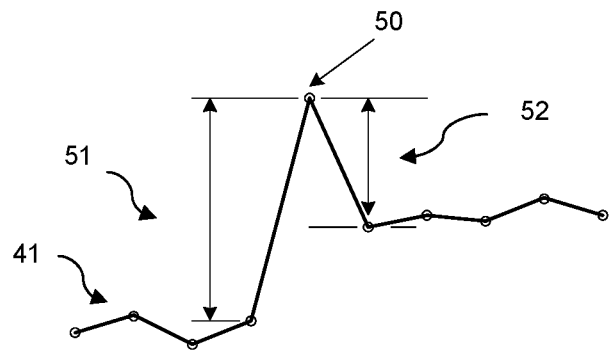
FIG. 3 is a visualisation of a deviating height value of a selected pixel.

Referring to FIG. 3, the measurement signal 41 is shown with discrete points that indicate different moments in time that the sheet passes the radiation beam 30. In a direction perpendicular to the transport direction, the measurement signal is also discrete by the individual sensor elements that form an array of sensors for measuring a height over a full width of the sheet. Measurement value 50 indicates a deviating value of the height measurement that occurs at the leading edge of the sheet. By comparing the difference 51 to a predetermined threshold value, the deviating value may be identified. Optionally the difference 52 may also be compared to a further threshold. In particular, the opposing directions of the differences signals a potential deviating value.

Figure 4:
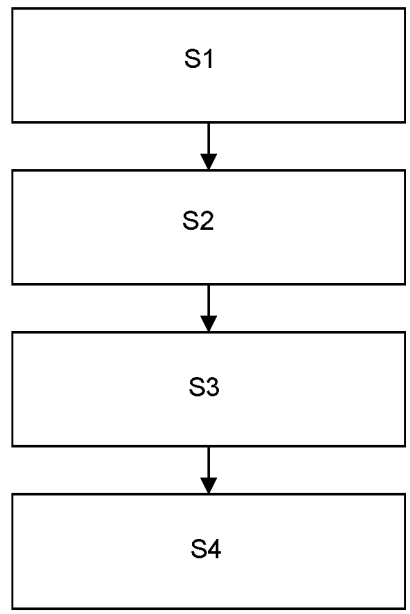
FIG. 4 is a flow diagram for determining a sheet height.

In FIG. 4, a method as executed by data processor 25 is shown. In a first step S1, the measurement data from the sensing device 22 are collected in a two-dimensional image, wherein the individual pixels have height values, indicating a measurement of a local elevation. The two-dimensional image is slightly larger than a sheet on a supporting surface in order to compare the elevation of the sheet to the elevation of the supporting surface. In step S2, pixels with deviating values are selected according to the criteria as outlined above. Step S3 substitutes a deviating value of a selected pixel by a realistic value, which is either a value of a neighbour pixel or a value obtained by extrapolation of non-selected pixels. In step S4, the sheet height is determined by taking a maximum value of all pixels in the image. A decision whether or not to send a control signal to the ejector device is derived from a comparison between the sheet height and a predetermined limit, based on a print gap in the print area.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for selecting a sheet for transportation along a print process unit by determining a sheet height of a sheet, the method comprising:
    conveying the sheet by a sheet transportation unit;
    sensing the surface geometry of the sheet, during the conveying, using an optical sensor, resulting in a two-dimensional height image of the sheet, the height image having pixels that have a value representing a local height of the sheet; and
    using a data processor to:
        select a pixel from the height image that has a deviating value in comparison to its direct environment;
        substitute the deviating value of the selected pixel by a realistic value that is derived from not selected pixels;
        determine a sheet height by finding a maximum value from the values of the not selected pixels and the substituted values; and
        eliminate a sheet if the sheet height is larger than a predetermined threshold.

2. The method according to claim 1, wherein a pixel is selected for having a deviating value if a first difference between the pixel value and a nearest neighbour pixel value exceeds a predetermined threshold.

3. The method according to claim 2, wherein a pixel is selected for having a deviating value if a difference between the pixel and a further nearest neighbour also exceeds a predetermined threshold and is opposite to the first difference.

4. The method according to claim 1, wherein the realistic value is derived from the nearest neighbour values by selecting one of the nearest neighbour values.

5. The method according to claim 1, wherein the realistic value is derived from the nearest neighbour values by extrapolating a number of values of pixels in a line pointing to the selected pixel.

6. The method according to claim 1, wherein a light beam is applied perpendicular to a sheet surface and the optical sensor is directed in a direction opposite to a transport direction of the sheet.

7. A printing system, comprising:
    a sheet transportation unit for conveying a sheet to a print process unit;
    an optical sensor for sensing a surface geometry to determine a two-dimensional height image of the sheet; and
    a data processor configured to determine a sheet height from the two-dimensional height image of the sheet by:
        selecting from the height image a pixel that has a deviating value;
        substituting the deviating value of the selected pixel by a realistic value that is derived from not selected pixels;
        determining a sheet height by finding a maximum value from the values of the not selected pixels and the substituted values; and
        eliminating a sheet if the sheet height is larger than a predetermined threshold.

8. A printing system according to claim 7, wherein a sheet expelling unit is comprised that expels a sheet from the transportation unit before the sheet arrives at the print process unit if the determined sheet height exceeds a predetermined threshold.

* * * * *